(12) United States Patent
Ohbitsu

(10) Patent No.: US 8,560,831 B2
(45) Date of Patent: Oct. 15, 2013

(54) DATA BROADCASTING SYSTEM, SERVER AND PROGRAM STORAGE MEDIUM

(75) Inventor: Toshiro Ohbitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 12/929,338

(22) Filed: Jan. 14, 2011

(65) Prior Publication Data

US 2011/0107080 A1 May 5, 2011

Related U.S. Application Data

(63) Continuation of application No. PCT/JP2008/064219, filed on Aug. 7, 2008.

(51) Int. Cl.
*H04L 29/06* (2006.01)

(52) U.S. Cl.
USPC .......................................... 713/150

(58) Field of Classification Search
USPC .................. 713/150, 168, 189, 193; 380/277
See application file for complete search history.

(56) References Cited

U.S. PATENT DOCUMENTS

| | | | |
|---|---|---|---|
| 6,681,015 B1 | 1/2004 | Hioki et al. | |
| 7,036,011 B2 * | 4/2006 | Grimes et al. | 713/156 |
| 2005/0044191 A1 | 2/2005 | Kamada et al. | |
| 2005/0108539 A1 * | 5/2005 | Skog et al. | 713/176 |
| 2009/0158273 A1 * | 6/2009 | Paul et al. | 717/178 |

FOREIGN PATENT DOCUMENTS

| | | |
|---|---|---|
| EP | 1633122 A2 | 3/2006 |
| JP | 11-313282 | 11/1999 |
| JP | 2003-256062 | 9/2003 |
| JP | 2004-312595 | 11/2004 |
| JP | 2004-342080 | 12/2004 |
| JP | 2006-067319 | 3/2006 |
| JP | 2006-179986 | 7/2006 |
| JP | 2007-096820 | 4/2007 |

OTHER PUBLICATIONS

International Search Report for PCT/JP2008/064219 A1, mailed Sep. 22, 2008.
English Translation of the International Preliminary Report on Patentability mailed Mar. 17, 2011 in corresponding International Patent Application PCT/ JP2008/064219.
Japanese Office Action issued Nov. 27, 2012 in corresponding Japanese Patent Application No. 2010-523688.

* cited by examiner

*Primary Examiner* — Beemnet Dada
(74) *Attorney, Agent, or Firm* — Staas & Halsey LLP

(57) ABSTRACT

A data broadcasting system includes a user device and a data broadcasting server. The device includes: a transmission requesting section transmitting the own model information and a request to transmit a content; and a content reproduction section reproducing the requested encoded content by decoding the content using key information for decoding the content. The server includes: a qualification storage section storing correspondence information where model information and reproduction qualification information are associated with each other; a reproduction qualification determination section referring to the correspondence information upon receiving the model information and the request from the user device, obtaining the reproduction qualification information corresponding to the model information, and determining whether the user device is qualified to reproduce the content; and a content transmission section transmitting, to the user device, the content and the key information when the user device is determined as being qualified by the reproduction qualification determination section.

6 Claims, 16 Drawing Sheets

| MANUFACTURER ID | MODEL ID | PAY-CONTENT REPRODUCTION QUALIFICATION |
|---|---|---|
| 1(COMPANY A) | 1(MODEL a)<br>2(MODEL b)<br>3(MODEL c)<br>⋮ | ×<br>○<br>○<br>⋮ |
| 2(COMPANY B) | 1(MODEL p)<br>2(MODEL g)<br>⋮ | ×<br>×<br>⋮ |
| 3(COMPANY C) | 1(MODEL u)<br>2(MODEL v)<br>⋮ | ○<br>○<br>⋮ |
| ⋮ | ⋮ | ⋮ |

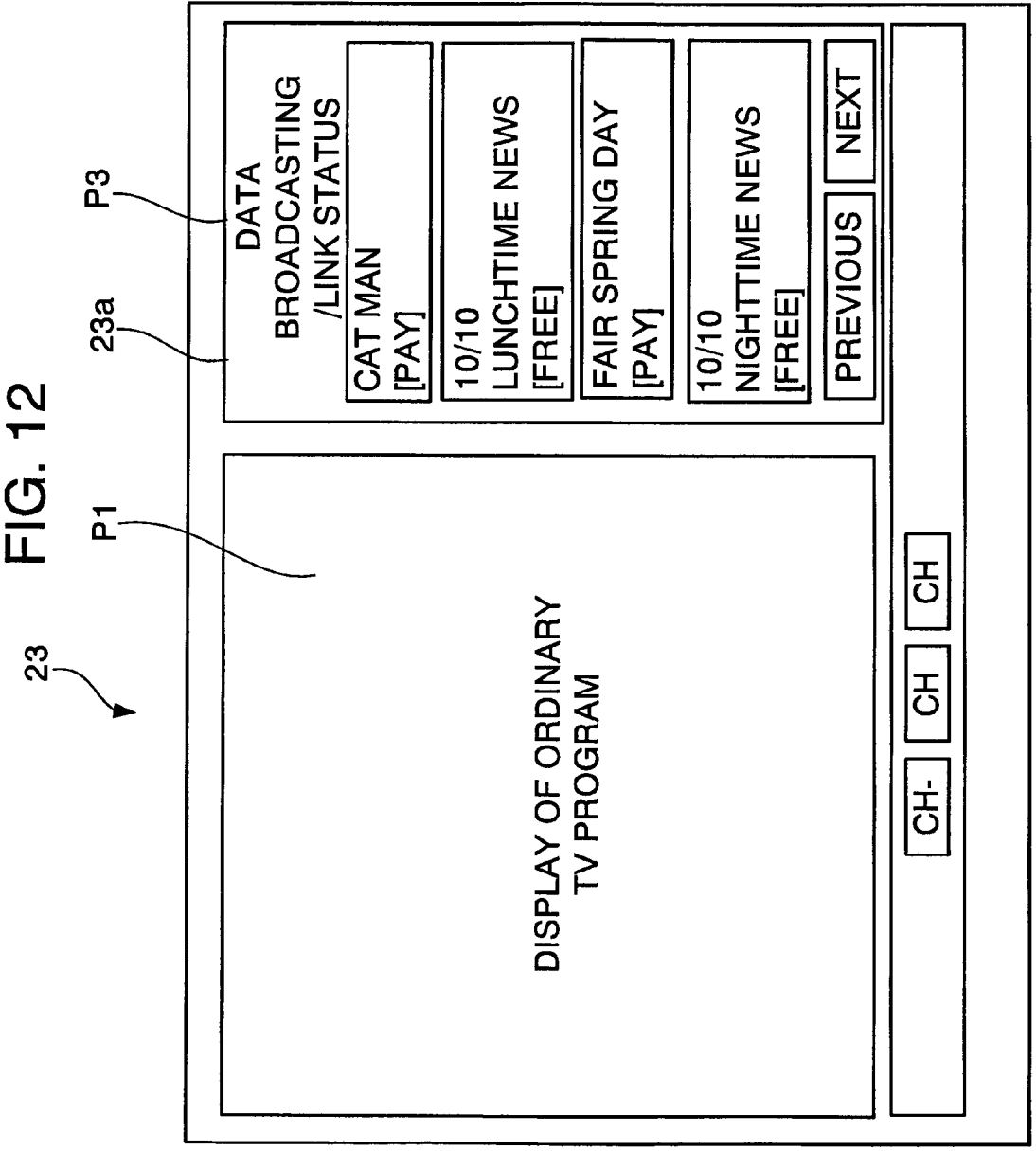

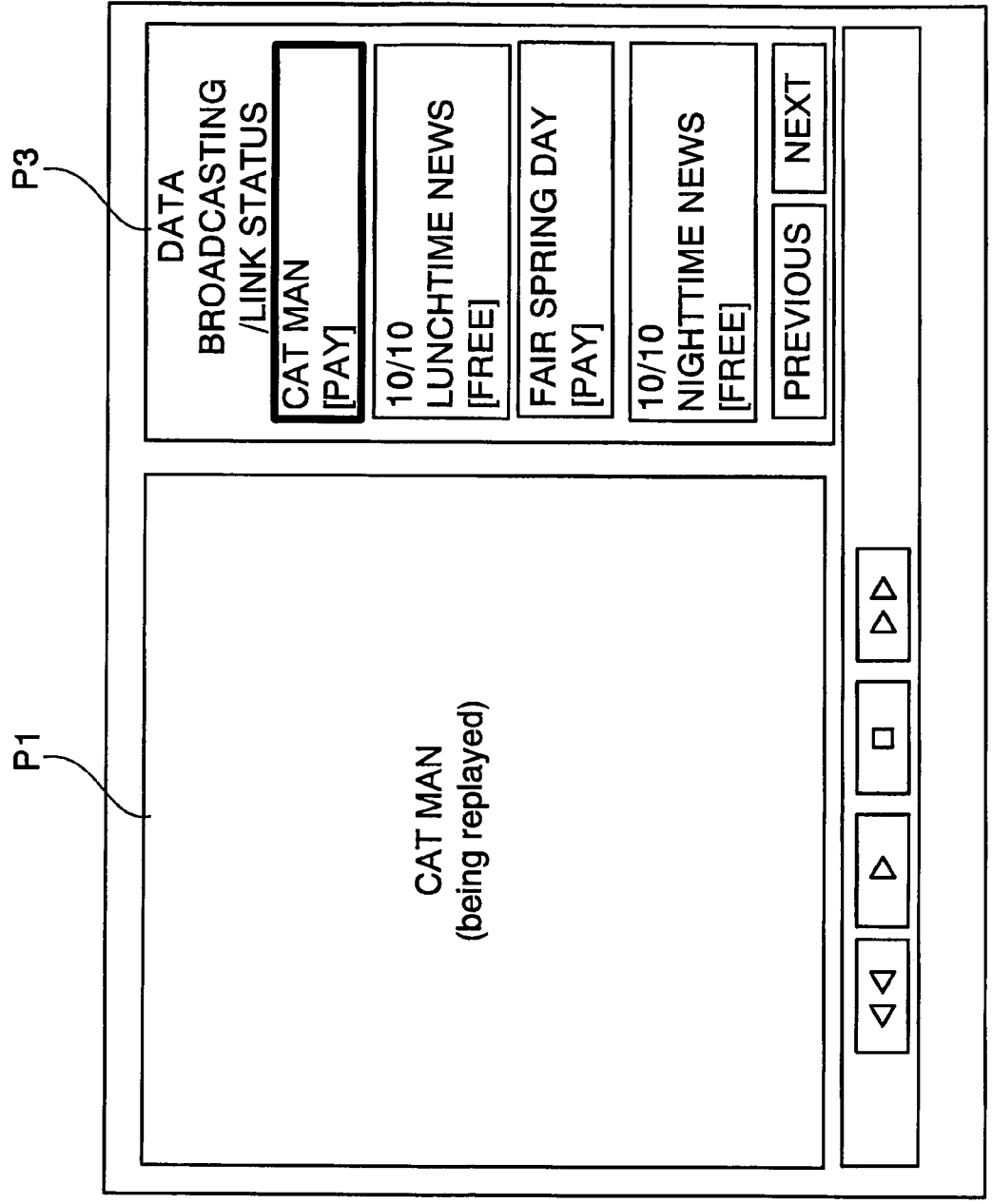

DATA BROADCASTING SYSTEM, SERVER AND PROGRAM STORAGE MEDIUM

CROSS-REFERENCE TO RELATED APPLICATION

This is a continuation application of PCT/JP2008/064219, filed on Aug. 7, 2008.

FIELD

The embodiments discussed herein are directed to a data broadcasting system, a data broadcasting server and a not-transitory data broadcasting program storage medium.

BACKGROUND

In digital terrestrial television broadcasting that transmits digitized image and sound signals based on ground waves, a broadcast signal band is split into thirteen segments and used. By using one of these segments, broadcasting called one-segment broadcasting mainly for mobile units has been put into practice. The receiving function of the one-segment broadcasting is introduced into not only dedicated television receivers but also information devices such as personal computers and portable telephones.

In the one-segment broadcasting, other than images and sounds of ordinary TV programs supplied through the ground waves from broadcasting stations, data broadcasting that supplies information via a network such as the Internet is implemented as a supplementary service. In the data broadcasting, link information is included in the information which has been transmitted through the ground waves from the broadcasting stations. This link information indicates a content that may be accessed through the Internet and is in the data broadcasting server. A user device that functions as a television receiver on the user side acquires the link information from the received ground waves, obtains the content according to the link information from a data broadcasting server, and displays the content. The content provided by the data broadcasting server includes not only texts but also images and sounds. In the one-segment broadcasting, there may be performed on-demand information provision according to a user's operation, beyond constraints of programs provided based on broadcast waves.

In the data broadcasting, there is desired a service that makes use of the feature of on-demand information provision and thereby providing special contents only to specific users. Conventionally, in network distribution only by communications among computers connected via a network, and CS (Communications Satellite) broadcasting as well as cable television broadcasting, a service called VOD (Video On Demand) and providing, for example, pay contents to user devices that have completed a charging procedure has been obtained.

In the VOD through the network, an administrative server, which is different from a contents server transmitting the contents, receives credit card information from a personal computer (PC) on the content receiving side, and transmits license information for descrambling by electronic mail. When the contents server transmits a content protected by scrambling or the like to the PC that is the user device on the reproduction side, the PC descrambles the content by using the acquired license information and displays the content.

Further, as a system of protecting special contents, there is known, for example, a system that applies DRM (Digital Rights Management) to a content to be supplied from a server to a user device and thereby limits the reproduction of the content (for example, see Japanese Laid-open Patent Publication No. 2004-342080). In this system, the user device transmits a digital signature to the server, and the server inserts the signature into a DRM message in the content.

Furthermore, in the CS broadcasting and the cable television broadcasting, when operation of selecting a pay content is performed by a user, this selection operation is accumulated in a built-in IC card as viewing data and the content is displayed. The viewing data accumulated in the IC card is made known to the distribution side by telephone line, for example.

In the CS broadcasting and the cable television broadcasting, users viewing the contents are limited and the IC card may be incorporated into every user device. However, in broadcasting, such as the one-segment broadcasting, in which users viewing the contents are not limited and PCs may be used as user devices, it is not realistic to newly incorporate IC cards and interfaces into all the user devices. Further, in the network distribution, a means of exchanging data with an administrative server by electronic mail and the like may be provided, making the configuration of the user device complicated. Furthermore, in the system using DRM, the DRM message is inserted into the content, and the content may be revised for every user device to change the signature in the DRM message. This makes the processing on the transmitting side complicated.

SUMMARY

According to an aspect of the invention, a data broadcasting system includes a user device and a data broadcasting server. The user device includes a transmission requesting section that is connected to a network, and transmits, via the network, the user device's own model information and a request to transmit a content on the network. The user device further includes a content reproduction section that receives an encrypted content which is the content requested by the transmission requesting section and key information which is used to decrypt the content, and decrypts the content to reproduce the key information. The data broadcasting server includes: a qualification storage section that stores correspondence information in which model information and reproduction qualification information representing a content reproduction qualification a model included in the model information are associated with each other. The data broadcasting server also includes a reproduction qualification determination section that refers to the correspondence information upon receipt of the request to transmit the model information and the content sent from the user device, obtains the reproduction qualification information according to the model information of the user device, and determines whether the user device is qualified to reproduce the content requested to transmit from the user device. The data broadcasting server further includes a content transmission section that transmits, to the user device, the content determined by the reproduction qualification determination section that the user device is qualified to reproduce, and the key information used to reproduce the content.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram that illustrates the correspondence information stored in the qualification storage section;

FIG. 12 is a diagram that illustrates a state in which the submenu is displayed in the user device;

FIG. 14 is a diagram that illustrates a state in which the pay content that has been transmitted from the server is displayed on the display screen of the user device.

DESCRIPTION OF EMBODIMENTS

An exemplary embodiment of the data broadcasting system will be described bellow.

Figure 1:
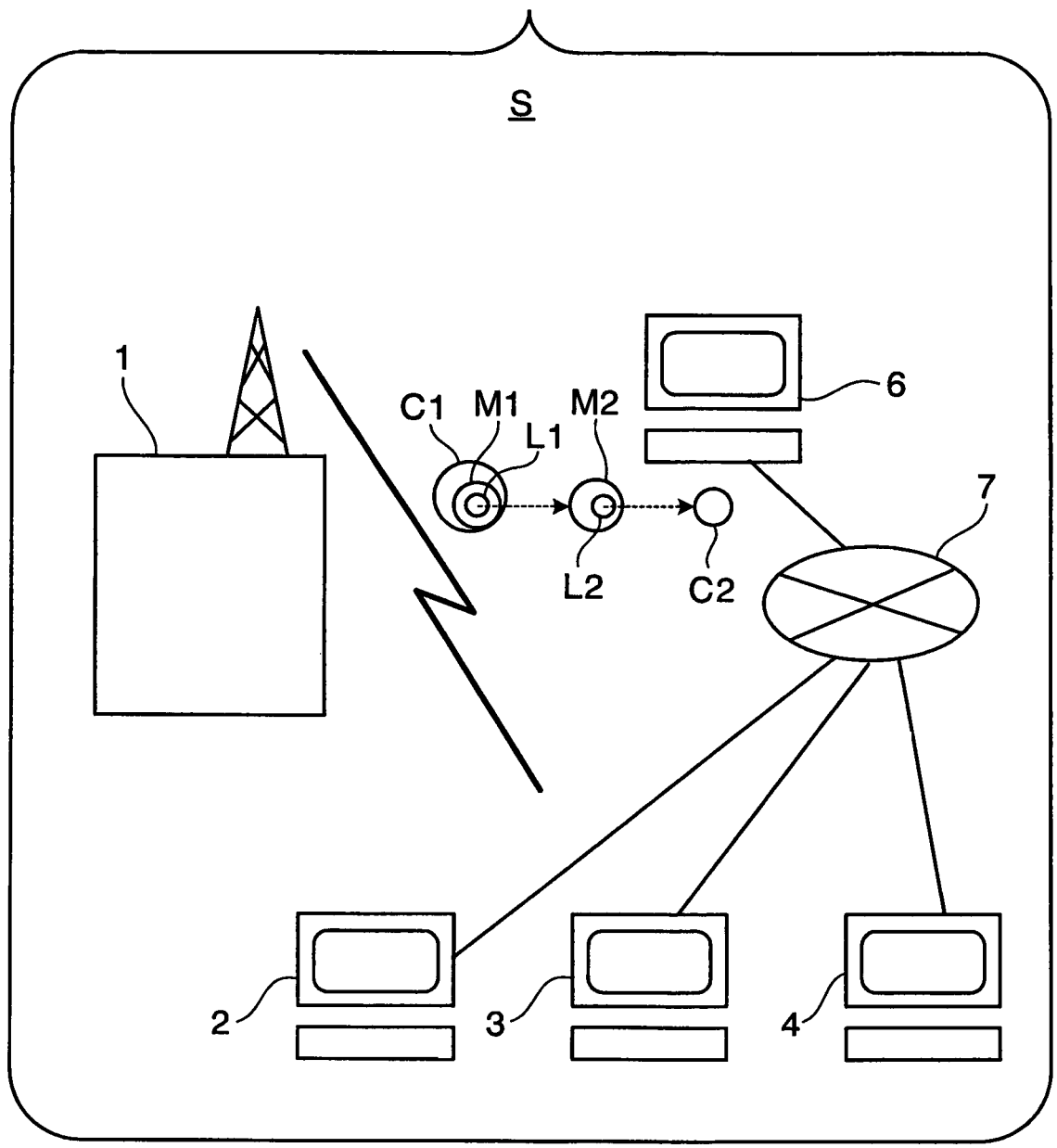
FIG. 1 is a diagram that illustrates one specific embodiment of the data broadcasting system.

FIG. 1 is a diagram that illustrates one specific embodiment of the data broadcasting system.

A data broadcasting system S illustrated in FIG. 1 includes: a broadcasting station 1 that transmits data of one-segment broadcasting based on ground waves; user devices 2, 3 and 4 that receive broadcasts from the broadcasting station; and a data broadcasting server 6 (hereinafter merely referred to as the server 6) that performs two-way communication with the user devices 2, 3 and 4 and thereby supplies information on data broadcasting. The user devices 2, 3 and 4 and the server 6 are connected by a network 7. The network 7 is, for example, the Internet.

The broadcasting station 1 wirelessly transmits the data of the one-segment broadcasting through broadcast waves (ground waves). Each of the user devices 2, 3 and 4 receives the data that has been transmitted from the broadcasting station 1. In a broadcast content C1 which is the data transmitted from the broadcasting station 1, images and sounds (hereinafter, the "images and sounds" are merely referred to as the "image") in ordinary television broadcasts are included, and the user devices 2, 3 and 4 receive, process, and thereby display the data that has been transmitted from the broadcasting station 1.

Here, a summary of the flow of the data among the broadcasting station 1, the user devices 2, 3 and 4, and the server 6 will be described.

The user devices 2, 3 and 4 also receive and display a content C2 transmitted through the network 7 as well as the broadcast content C1. In the present embodiment, the server 6 stores the content C2, and transmits the content C2 to the user devices 2, 3 and 4 by way of the network 7 in response to a request from the user devices 2, 3 and 4. The user devices 2, 3 and 4 request the server 6 to transmit the content according to link information L2 that indicates the content C2 on the network. This link information L2 is supplied from the server 6 as submenu data M2. Further, the submenu data M2 that includes this link information L2 also is transmitted in response to a request from the user devices 2, 3 and 4. Based on another link information L1 that indicates the menu data including the link information L2, the user devices 2, 3 and 4 request the server 6 to transmit the submenu data M2. This another link information L1 is included in the broadcast content C1 that has been broadcasted from the broadcasting station 1 in form of the menu data M1. The link information L1 included in the broadcast content C1 transmitted from the broadcasting station 1 will be referred to as primary link information, and the link information L2 transmitted from the server 6 will be referred to as secondary link information.

In other words, the primary link information L1 is included in the broadcast content C1 broadcasted from the broadcasting station 1, and the primary link information L1 indicates the secondary link information L2. The secondary link information L2 transmitted from the server 6 indicates the content C2 stored in the server. The submenu data M2 that includes the secondary link information L2 will be referred to as submenu data.

Unlike the broadcast content C1, the content C2 that may be transmitted via the network 7 is more than one. The link information is layered to indicate multiple contents efficiently. For example, plural pieces of primary link information L1 that indicate plural pieces of submenu data M2 are included in the menu data M1 broadcasted from the broadcasting station 1, and plural pieces of secondary link information L2 are included in the respective plural pieces of submenu data M2. In FIG. 1, one piece for each of the primary link information L1 and the secondary link information L2 is illustrated so that the indicated relationships (illustrated in broken lines) are easy to see.

The menu data M1 and the submenu data M2 including the link information L1 and L2 are described in BML (Broadcast Markup Language) defined by ARIB (Association of Radio Industries and Businesses), and described as a menu representing a list of selectable contents. BML is a markup language defined based on XHTML (Extensible Hypertext Markup Language). The link information L1 and L2 each have a URL (Uniform Resource Locator).

Figure 2:
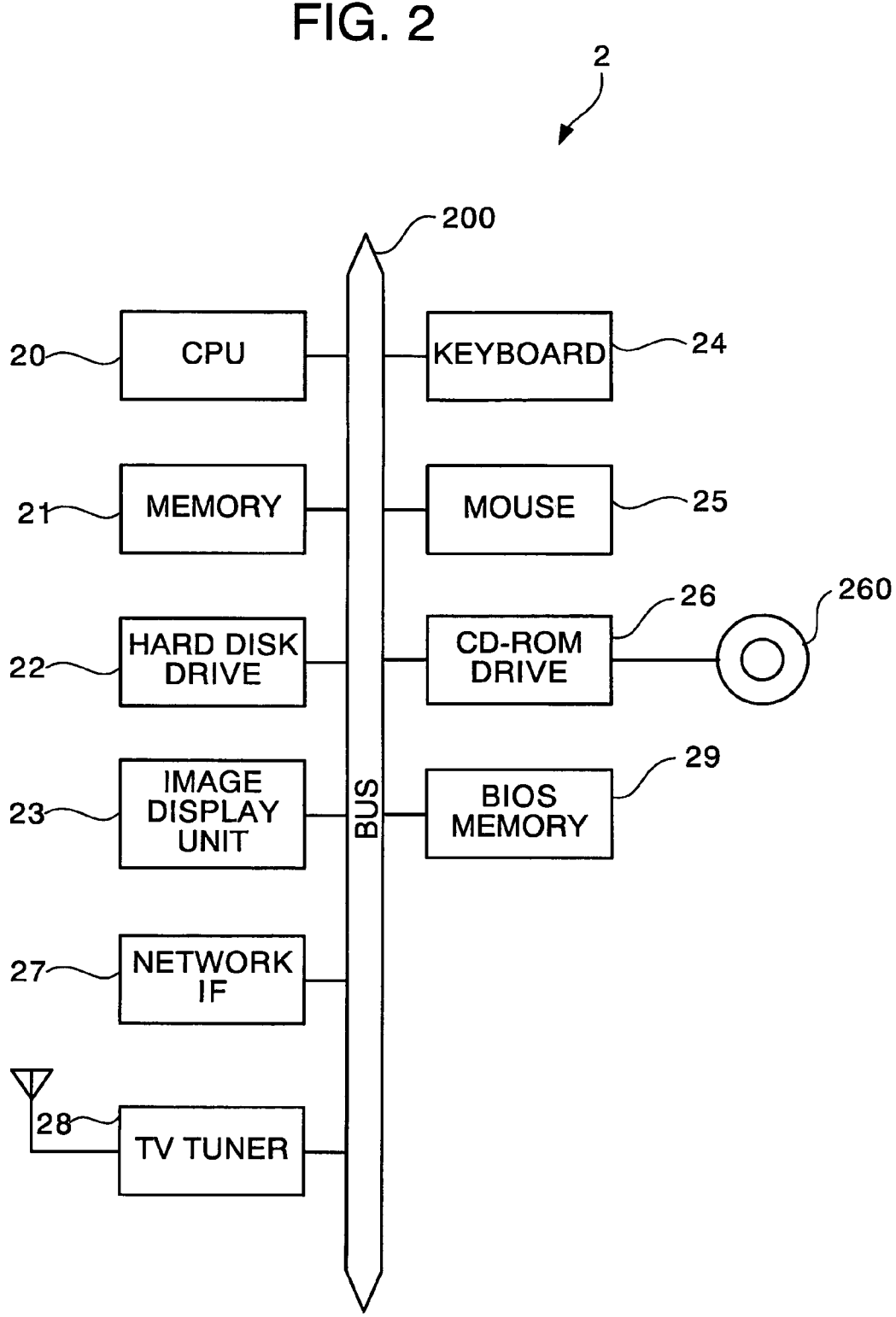
FIG. 2 is a block diagram that illustrates a hardware configuration of the user device illustrated in FIG. 1.

FIG. 2 is a block diagram that illustrates a hardware configuration of the user device illustrated in FIG. 1.

The user devices 2, 3 and 4 are personal computers, and mutually differ in terms of model and performance. However, the user devices 2, 3 and 4 have basic hardware configurations in common. Therefore, the difference in the performance will be described later, and the basic hardware configuration will be described by illustrating the user device 2 as a representative.

The user device 2 includes a CPU 20, a memory 21, a hard disk drive 22, an image display unit 23, a keyboard 24, a mouse 25, a CD-ROM drive 26, a network IF 27, a TV tuner 28 and a BIOS memory 29. These are interconnected through a bus 200.

The CPU 20 controls each part in the user device 2 by executing a program, and processes data output from each part. The memory 21 temporarily stores the program executed by the CPU 20 and data. Various types of program and data are stored in the hard disk drive 22. The image display unit 23 displays images on a display screen. The keyboard 24 inputs an instruction and character information according to a user's operation, and the mouse 25 designates an arbitrary position on the display screen of the image display unit 23 according to the user's operation and thereby inputs an instruction corresponding to the position. The CD-ROM drive 26 is loaded with the CD-ROM 260 serving as a recording medium to access the CD-ROM 260. The network IF 27 uses, for example, a communication protocol represented by IP, thereby connecting to the server 6 through the network 7. The TV tuner 28 receives the broadcast waves transmitted from the broadcasting station. To be more specific, the TV tuner 28 selects and receives a radio wave in a frequency band according to each channel, performs OFDM (Orthogonal Frequency Division Multiplexing) demodulation, and outputs the demodulated signal in form of TS (Transport Stream) signal.

In the BIOS memory 29, a BIOS (Basic Input Output System) program for causing each part in the user device 2 to operate is stored. Further, in the BIOS memory 29, data to identify each user device is stored at the time of manufacturing the user device. The BIOS memory 29 is, for example, a non-volatile memory represented by a flash memory. Further, in the hard disk drive 22, data representing the manufacturer of the user device and the model of the user device is stored.

Figure 3:
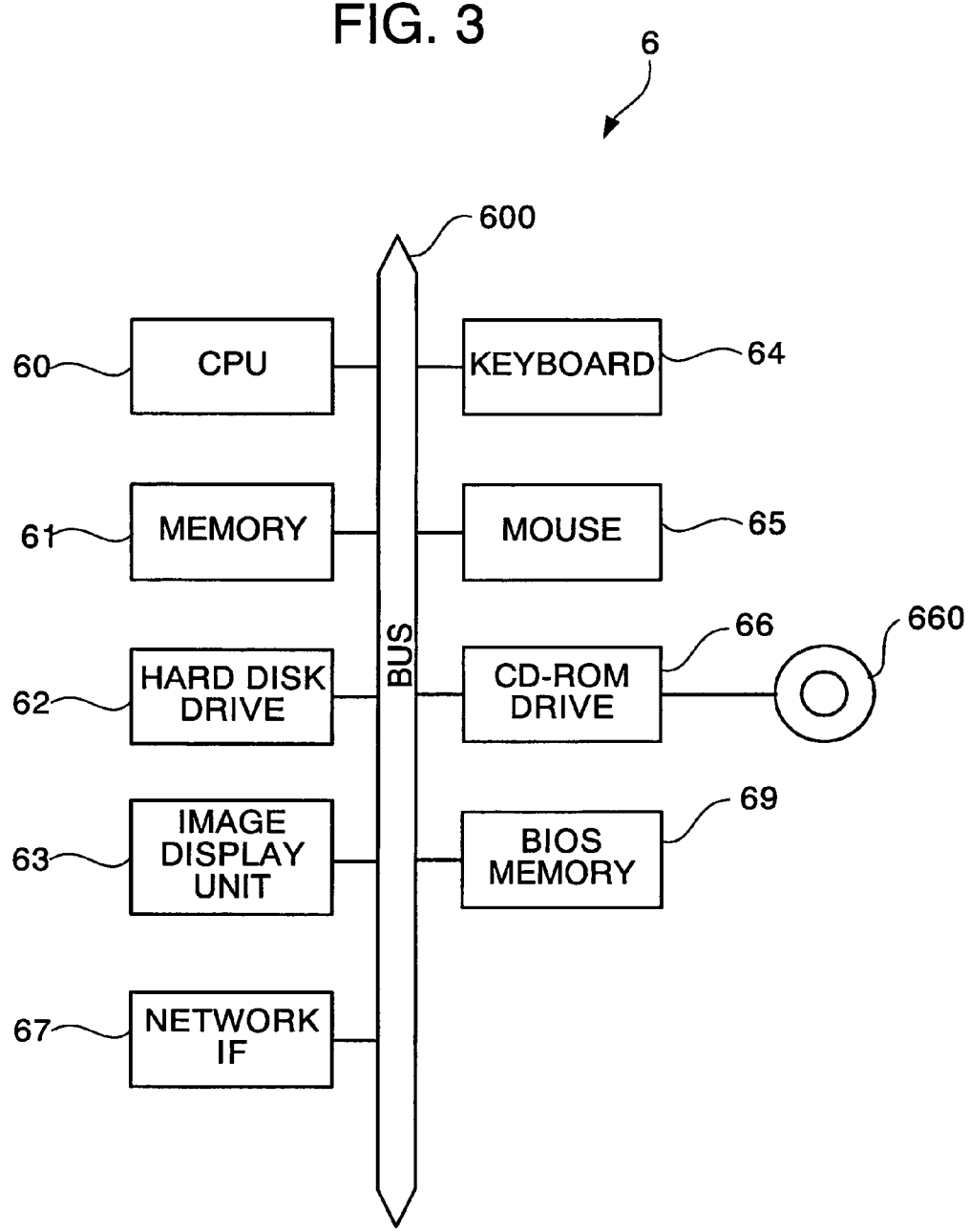
FIG. 3 is a block diagram that illustrates a hardware configuration of the server illustrated in FIG. 1.

FIG. 3 is a block diagram that illustrates a hardware configuration of the server illustrated in FIG. 1.

The server 6 illustrated in FIG. 3 includes a CPU 60, a memory 61, a hard disk drive 62, an image display unit 63, a keyboard 64, a mouse 65, a CD-ROM drive 66, a network IF 67 and a BIOS memory 69. These are interconnected through a bus 600. The server 6 is a computer that has a basic structure in common with the user device illustrated in FIG. 2 except that the server 6 is not provided with the TV tuner and thus, further detailed description will be omitted. However, the performance of each part of the server 6 is higher than that of the user device 2, because the server 6 communicates with the plural user devices and supplies the contents simultaneously.

Figure 4:
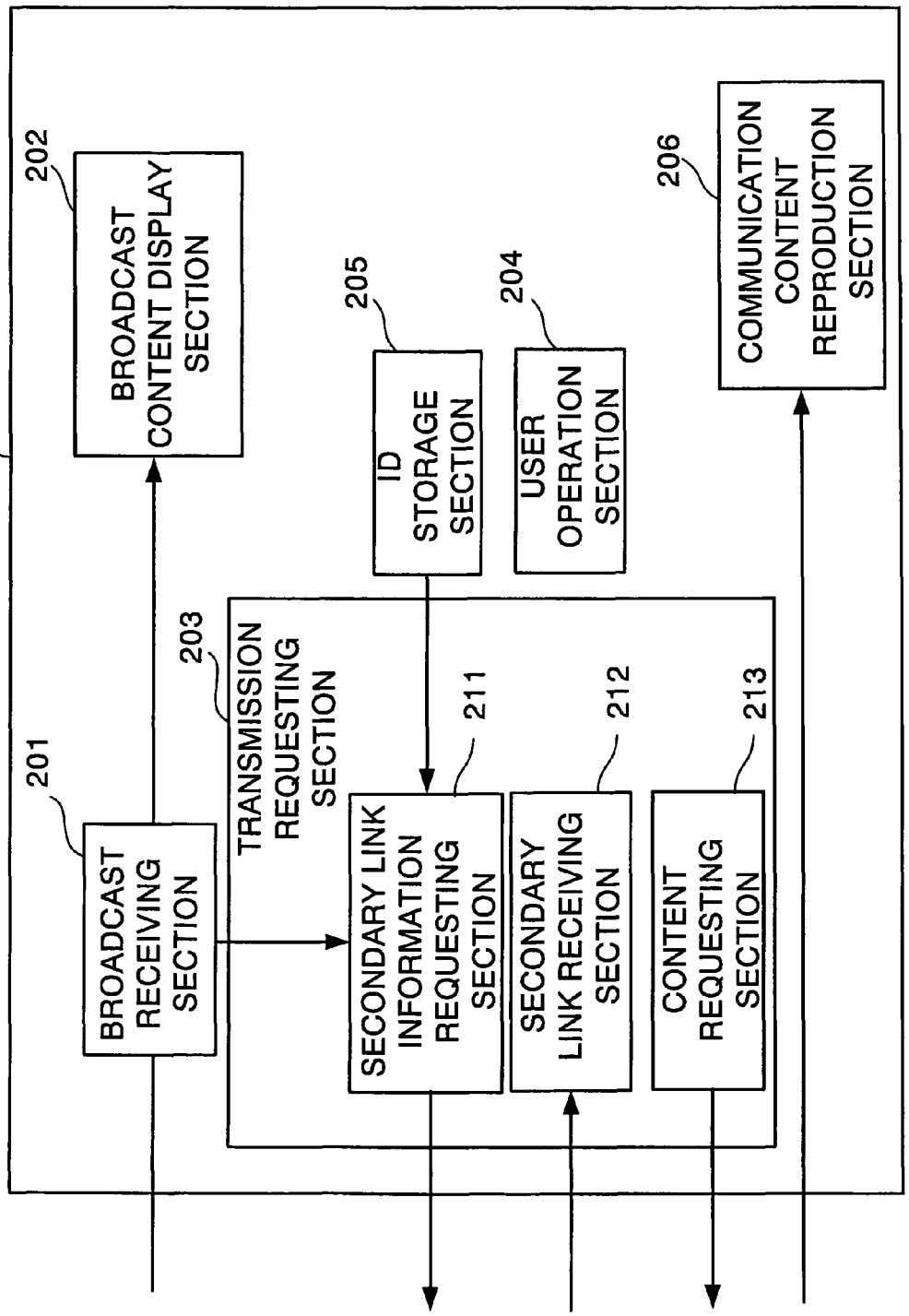
FIG. 4 is a block diagram that illustrates a configuration of main functional blocks of the user device illustrated in FIG. 1.

FIG. 4 is a block diagram that illustrates a configuration of main functional blocks of the user device illustrated in FIG. 1.

The user device 2 includes a broadcast receiving section 201, a broadcast content display section 202, a transmission requesting section 203, a user operation section 204, an ID storage section 205, and a communication content reproduction section 206. Further, the transmission requesting section 203 includes a secondary link information requesting section 211, a secondary link receiving section 212, and a content requesting section 213. These functional blocks function by execution of programs stored in the hard disk drive 22 and the CD-ROM 260 by the CPU 20. The remaining user devices 3 and 4 also have functional blocks similar to those of the user device 2. A combination of the TV tuner 28 and the CPU 20 illustrated in FIG. 2 corresponds to the broadcast receiving section 201, and a combination of the image display unit 23 and the CPU 20 illustrated in FIG. 2 corresponds to the broadcast content display section 202. Further, a combination of the keyboard 24, the mouse 25 and the CPU 20 illustrated in FIG. 2 corresponds to the user operation section 204, and a combination of the network IF 27 and the CPU 20 illustrated in FIG. 2 corresponds to the transmission requesting section 203. Furthermore, a combination of the BIOS memory 29 and the hard disk drive 22 illustrated in FIG. 2 corresponds to the ID storage section 205, and a combination of the image display unit 23 and the CPU 20 illustrated in FIG. 2 corresponds to the communication content reproduction section 206.

The broadcast receiving section 201 receives a broadcast from the broadcasting station 1. To be more specific, the broadcast receiving section 201 receives and demodulates a broadcast wave corresponding to a channel, and outputs the broadcast content C1 carried by the broadcast wave. The broadcast content C1 (see FIG. 1) transmitted from the broadcasting station 1 includes image data and the menu data M1 to start receiving the content of the data broadcasting.

The broadcast content display section 202 displays the broadcast content C1 received by the broadcast receiving section 201 from the broadcasting station 1. To be more specific, the broadcast content display section 202 decodes the data of the image extracted by the broadcast receiving section 201 and displays the image on the display screen of the image display unit 23, and also displays the menu data M1 for starting the data broadcasting on the display screen of the image display unit 23. The broadcast content display section 202 displays the menu data M1 in response to data-broadcasting starting operation of the user operation section 204. Further, the broadcast content display section 202 also displays, in response to the reception in the transmission requesting section 203, the submenu data M2 including the secondary link information, and the content C2.

Figure 7:
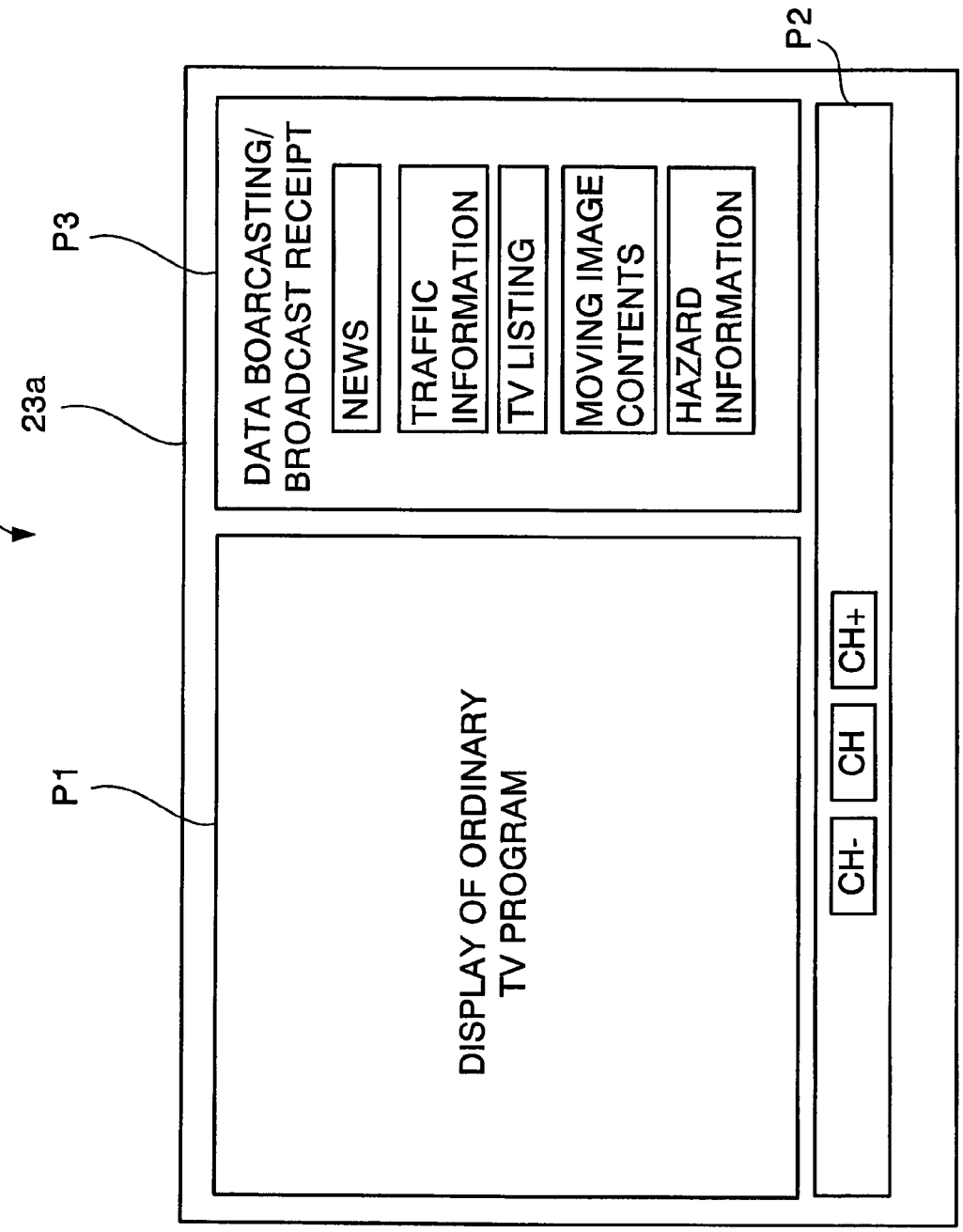
FIG. 7 is a diagram that illustrates a state in which the broadcast content received from the broadcasting station is displayed on the display screen of the image display unit.

FIG. 7 is a diagram that illustrates a state in which the broadcast content received from the broadcasting station is displayed on the display screen of the image display unit.

An image of the broadcast content C1 received from the broadcasting station is displayed in an upper left area P1 of a display screen 23a of the image display unit 23. Also, in a lower area P2, channel buttons to select broadcast waves of other channels are displayed. Further, in an upper right area P3, the menu data M1 is displayed. The menu data M1 is described in BML in reality, and in each of the plural pieces of primary link information included in the menu data M1, an item name to be displayed as a select button, a URL corresponding to the item name, and a display attribute of the select button are included. The URL of the primary link information indicates the submenu data M2 including the secondary link information stored in the server 6. The broadcast content display section 202 functions as a BML browser, interprets the menu data M1 described in BML, and displays the menu data M1 in the upper right area P3. In the area P3, "news", "traffic information", "TV listing", "moving image contents" and "hazard information", which are item names included in the respective pieces of primary link information, are displayed as the select buttons.

According to the operation of the user, the user operation section 204 illustrated in FIG. 4 designates any of the pieces of primary link information included in the menu data M1 of the broadcast content C1. More specifically, when any of the select buttons displayed in the upper right area P3 on the display screen 23a of the broadcast content display section 202 is selected according to the operation of the keyboard 24 or the mouse 25 by the user, the user operation section 204 designates the URL corresponding to the primary link information of the selected button. The user operation section 204 performs designation of the secondary link information in a manner similar to that of the primary link information.

The transmission requesting section 203 is connected to the network 7, and receives and transmits data through the network 7. The transmission requesting section 203 transmits the own model information and requests the transmission of the content on the network.

In response to the primary link information being designated by the user operation section 204 from among the menu data received by the broadcast receiving section 201, the secondary link information requesting section 211 requests the transmission of the secondary link information indicated by the URL of the designated primary link information. The request of the transmission is performed by sending a transmit command to the server 6. This transmit command includes a user agent into which the user device's own information is inserted.

Figure 8:
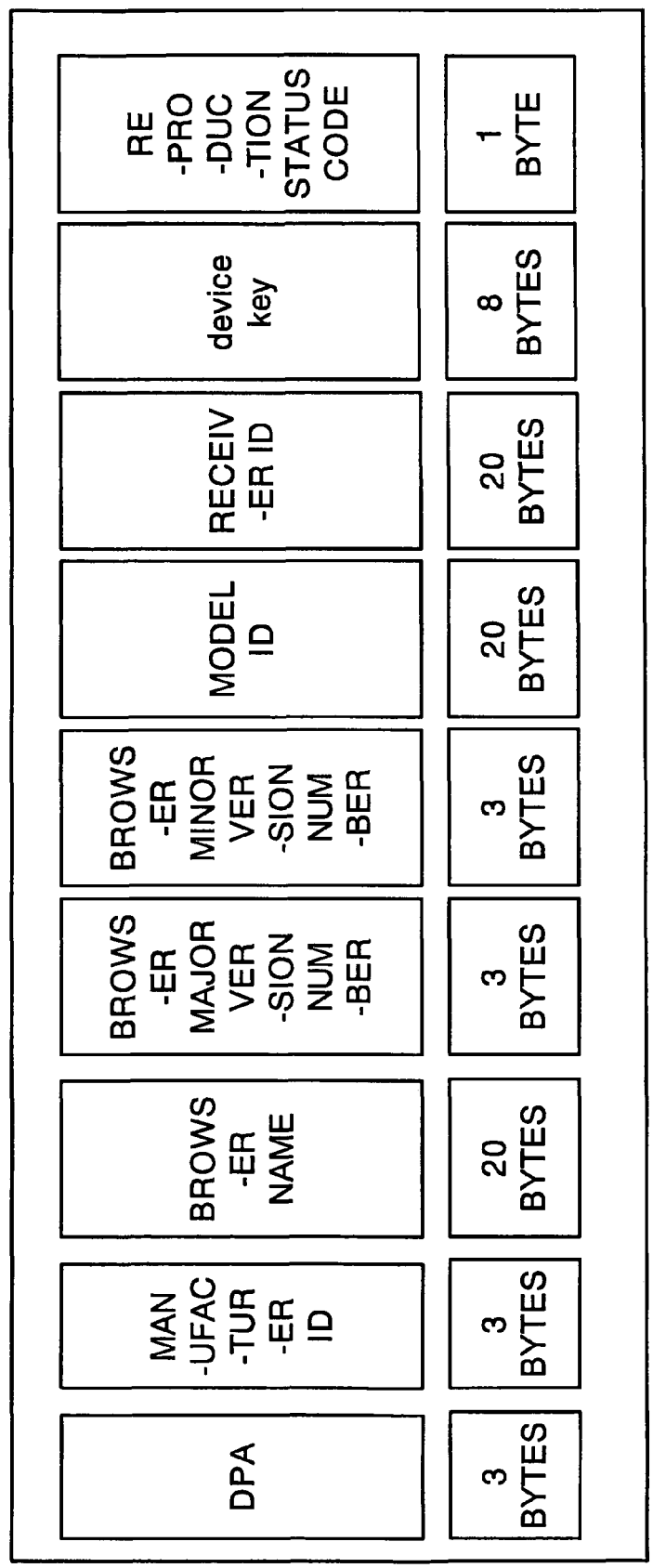
FIG. 8 is a diagram that illustrates a data structure of the user agent.

FIG. 8 is a diagram that illustrates a data structure of the user agent.

The user agent (User-Agent) inserted into the transmission request command is defined by ARIB TR-14 standard, and includes: characters of "DPA" (3 bytes), a manufacturer ID (3 bytes) that represents the manufacturer of the user device, a browser name (20 bytes) that represents the browser provided in the user device, a browser major version number (3 bytes), a browser miner version number (3 bytes), a model ID (20 bytes) that represents the model of the user device, a receiver ID (20 bytes) to identify the user device itself, a device key (8 bytes) used to decrypt an encrypted content, and a reproduction status code (1 byte) that represents the reproduction status of the content in the user device. The user agent is exchanged between the user device 2 and the server 6 in a bidirectional manner. The secondary link information requesting section 211 reads the manufacturer ID, the model ID and the serial number from the ID storage section 205, inserts the read manufacturer ID, model ID and serial number into the manufacturer ID, the model ID and the receiver ID of the user agent, respectively, and transmits the transmission request command into which this user agent is inserted.

The secondary link receiving section 212 receives the second link information that has been transmitted from the server 6. To be more specific, the secondary link receiving section 212 receives the submenu data M2 including the second link information, and causes the communication content reproduction section 206 to display the submenu data M2. In response to the second link information being designated by the user operation section 204, the content requesting section 213 requests the transmission of the content indicated by the URL of the designated secondary link information. Further, the secondary link receiving section 212 inserts a value corresponding to the reproduction status of the content into the reproduction status code of the user agent, and transmits this user agent to the server.

The communication content reproduction section 206 reproduces and displays the content that has been transmitted from the server 6 through the network 7. The communication content reproduction section 206 and the broadcast content display section 202 share the image display unit 23 as hardware, and display the respective contents by switching a part or all of the display screen 23a. The communication content reproduction section 206 also receives the device key that is key information from the server 6 through the network 7. The device key is inserted into the user agent and arrives. When receiving the device key, the communication content reproduction section 206 also decrypts the encrypted content by using this device key.

Figure 5:
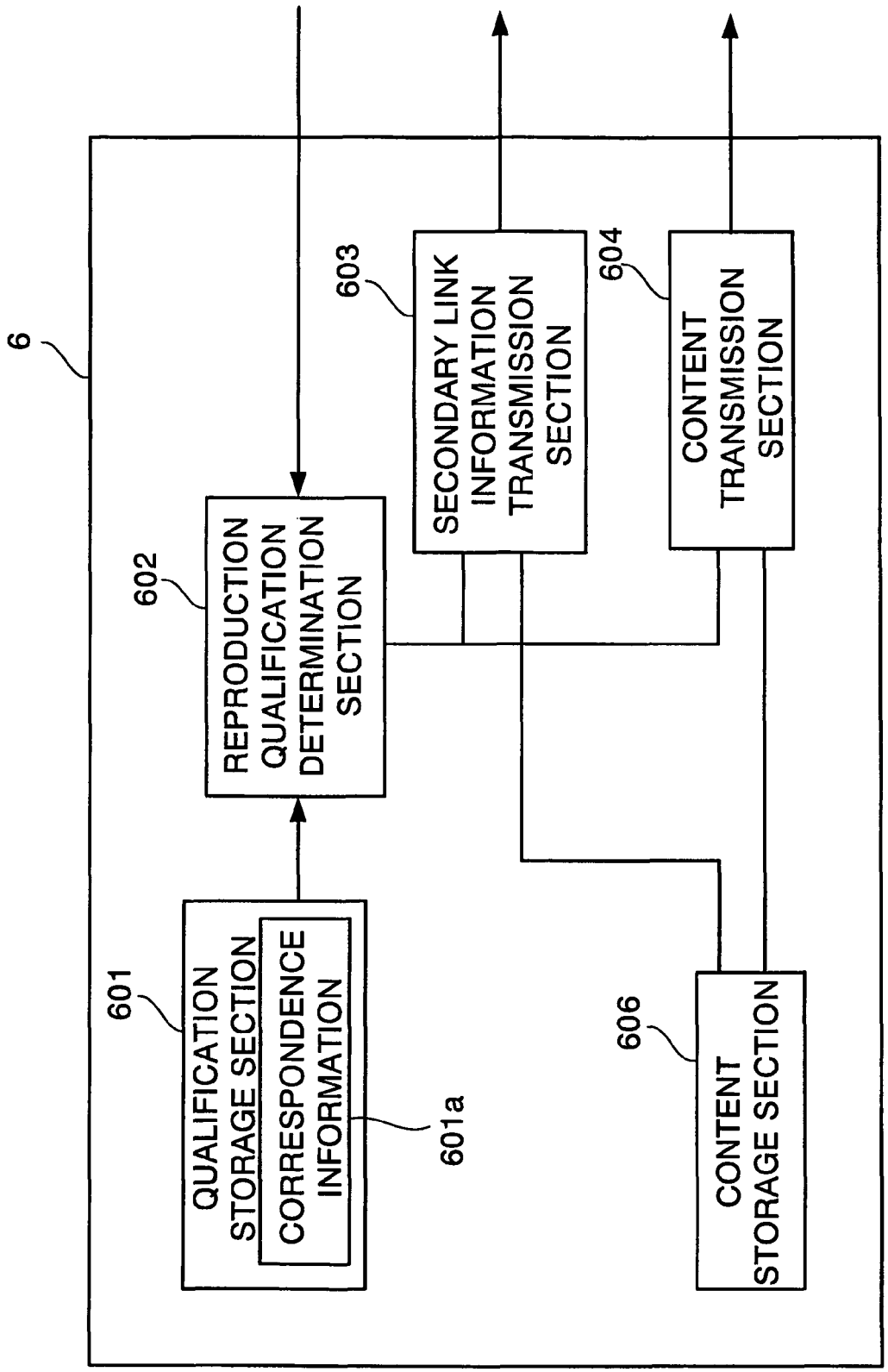
FIG. 5 is a block diagram that illustrates a configuration of main functional blocks of the data broadcasting server illustrated in FIG. 1.

FIG. 5 is a block diagram that illustrates a configuration of main functional blocks of the data broadcasting server illustrated in FIG. 1.

The server 6 includes a qualification storage section 601, a reproduction qualification determination section 602, a secondary link information transmission section 603, a content transmission section 604, and a content storage section 606. Each of the memory 61 and the hard disk drive 62 illustrated in FIG. 3 corresponds to the qualification storage section 601, and a combination of the CPU 60 and the network IF 67 illustrated in FIG. 3 corresponds to the secondary link information transmission section 603. Further, each of the memory 61 and the hard disk drive 62 illustrated in FIG. 3 corresponds to the content storage section 606, and a combination of the CPU 60 and the network IF 67 corresponds to the content transmission section 604. Furthermore, a combination of the CPU 60 and the network IF 67 illustrated in FIG. 3 corresponds to the reproduction qualification determination section 602.

The qualification storage section 601 stores correspondence information 601a in which the model information of the user device and the pay-content reproduction qualification information of the model are associated with each other. The user devices receiving the service of the data broadcasting vary by model in terms of the qualification to reproduce special pay contents. For example, a PC, namely the user device, of a model sold at a price including a viewing charge for pay contents is registered as a user device qualified to reproduce the pay contents.

FIG. 9 is a diagram that illustrates the correspondence information stored in the qualification storage section. In FIG. 9, the correspondence information 601a is illustrated in tabular form.

The correspondence information 601a has fields of manufacturer ID, model ID, and pay-content reproduction qualification. Among them, a combination of the manufacturer ID and the model ID represents the model information. Further, the pay-content reproduction qualification represents the pay-content reproduction qualification information. For example, in a case in which the value of the manufacturer ID is 1 and the value of the model ID is 1, a model "a" of a company A represents the user device, and this model is not qualified to reproduce the pay contents. Meanwhile, a model "b" and a model "c" of the company A are qualified to reproduce the pay contents. Addition and update are made in the correspondence information 601a in response to an announcement of a new-model user device by the manufacturer.

Upon receipt of the transmission request including the model information of the user device and transmitted from the user devices 2, 3 and 4, the reproduction qualification determination section 602 refers to the correspondence information 601a, and obtains the content reproduction qualification information of the user devices 2, 3 and 4. Further, based on the content reproduction qualification information, the reproduction qualification determination section 602 determines whether the user device that has transmitted the transmission request is qualified to reproduce the content requested in the transmission request.

The secondary link information transmission section 603 transmits the secondary link information for which the transmission request has been received from the user devices 2, 3 and 4, to the user device. To be more specific, the secondary link information transmission section 603 reads the submenu data M2 including the secondary link information from the content storage section 606, and transmits the submenu data M2. The submenu data M2 is described in BML like the menu data M1, and the item name displayed as the select button and the URL corresponding to the item name are included in each piece of the secondary link information included in the submenu data M2. The URL of the secondary link information indicates the content stored in the server 6.

In the content storage section 606, the content C2 and the submenu data M2 supplied to the user device by the data broadcasting are stored. The content C2 includes a free-of-charge content to be reproduced by any of the user devices and a pay content that is a special content to be reproduced by only the user devices of a specific model. The pay content is encrypted, and may be reproduced by the user device having the corresponding device key. The content storage section 606 also stores the device key corresponding to the pay content.

The content transmission section 604 reads, from the content storage section 606, the content requested by the transmission request from the transmission requesting section 203 of each of the user devices 2, 3 and 4, and transmits, via the network 7, the read content to the user device that has sent the request. Further, the content transmission section 604 also transmits, to the user device, the device key of the content to be reproduced by the user device determined to be qualified to reproduce the content by the reproduction qualification determination section 602.

Figure 6:
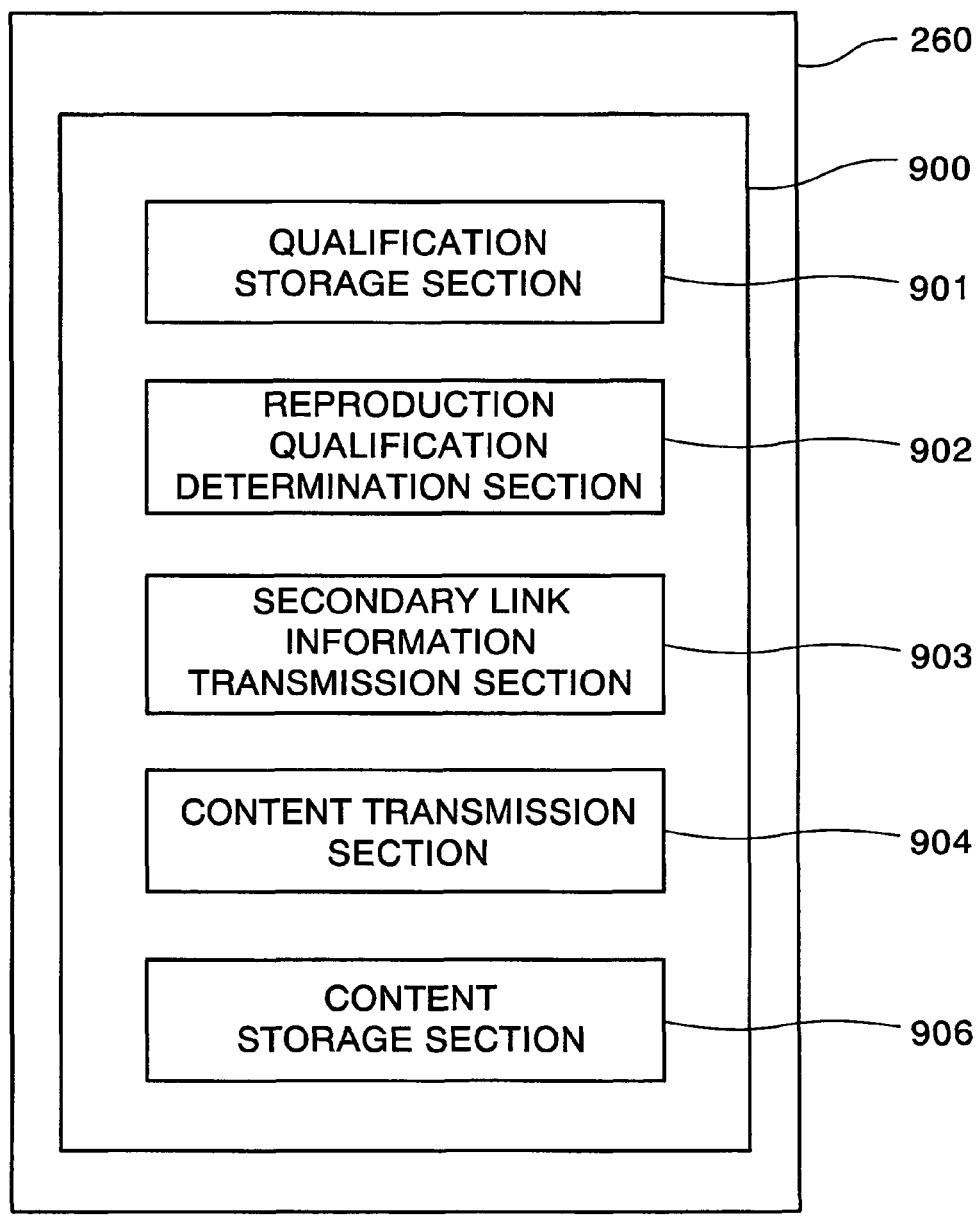
FIG. 6 is a diagram that illustrates the configuration of a data broadcasting program.

FIG. 6 is a diagram that illustrates the configuration of a data broadcasting program.

Here, a data broadcasting program 900 is stored in the CD-ROM 260, and includes a qualification storage section 901, a reproduction qualification determination section 902, a secondary link information transmission section 903, a content transmission section 904, and a content storage section 906. The execution of the data broadcasting program 900 by the CPU 60 illustrated in FIG. 3 implements the qualification storage section 601, the reproduction qualification determination section 602, the secondary link information transmission section 603, the content transmission section 604, and the content storage section 606 illustrated in FIG. 5.

Figure 10A:
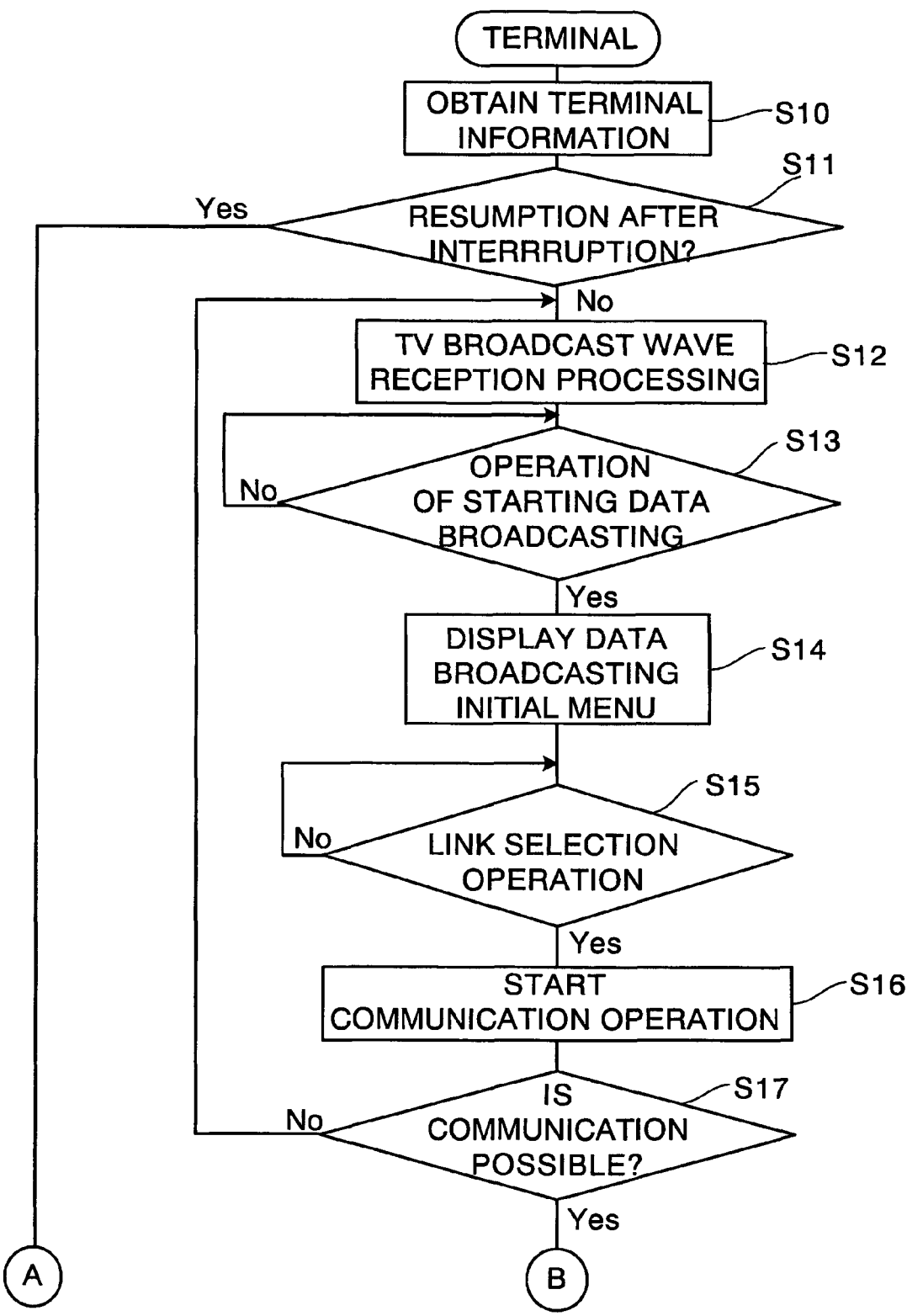
FIG. 10 is a flow chart that illustrates processing in the user device illustrated in FIG. 4.
Figure 10B:
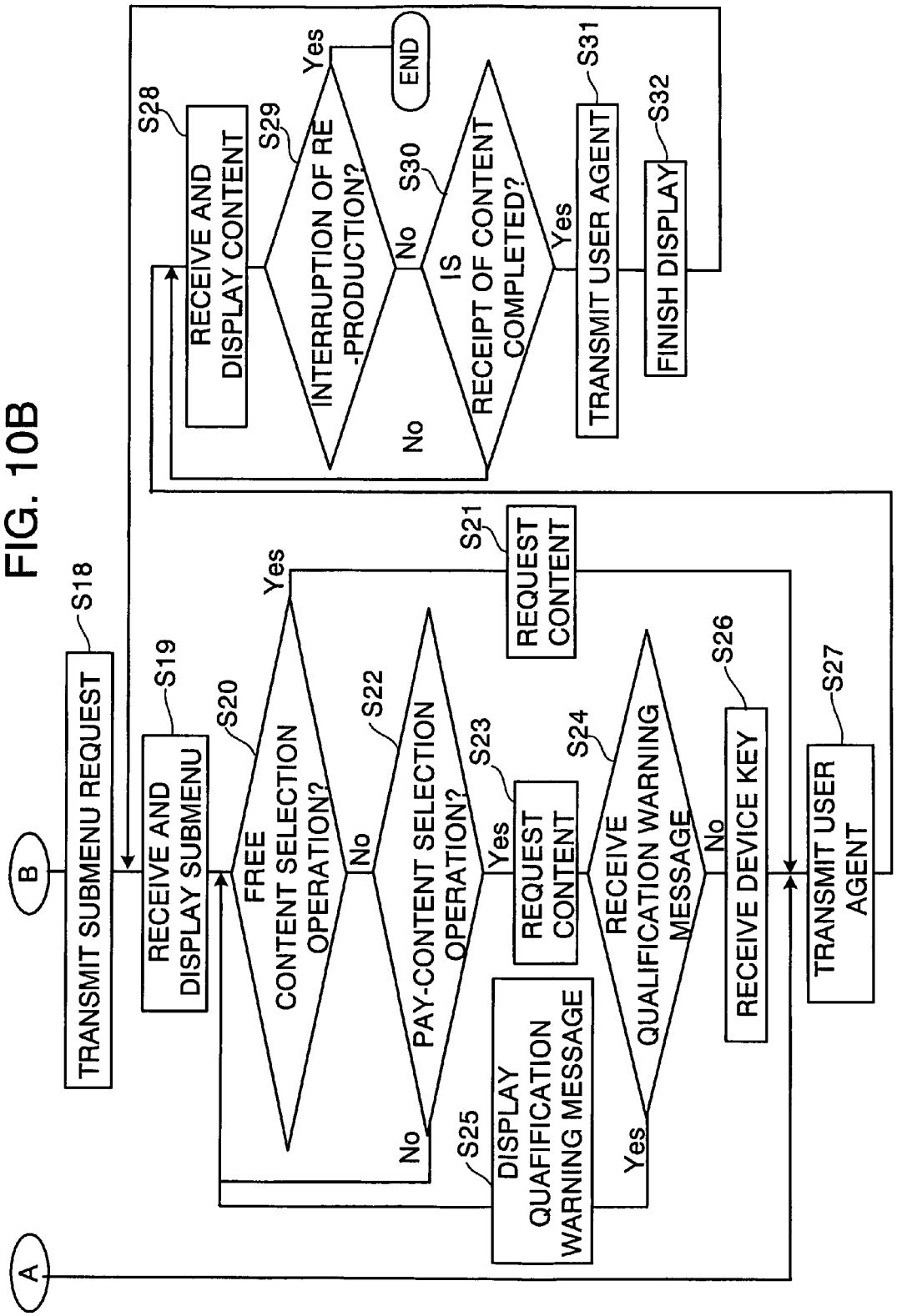
Figure 11A:
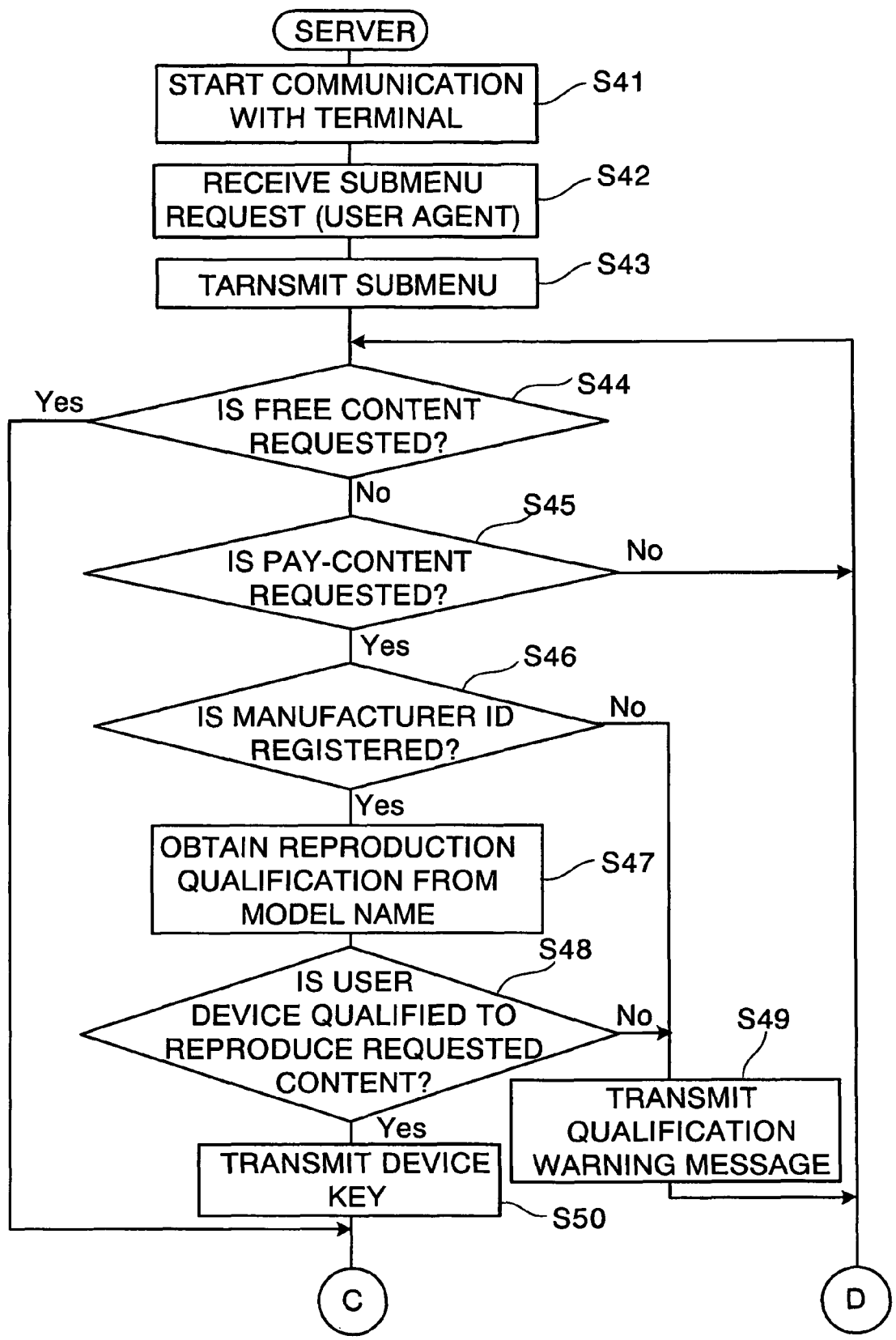
FIG. 11 is a flow chart that illustrates processing in the data broadcasting server illustrated in FIG. 5.
Figure 11B:
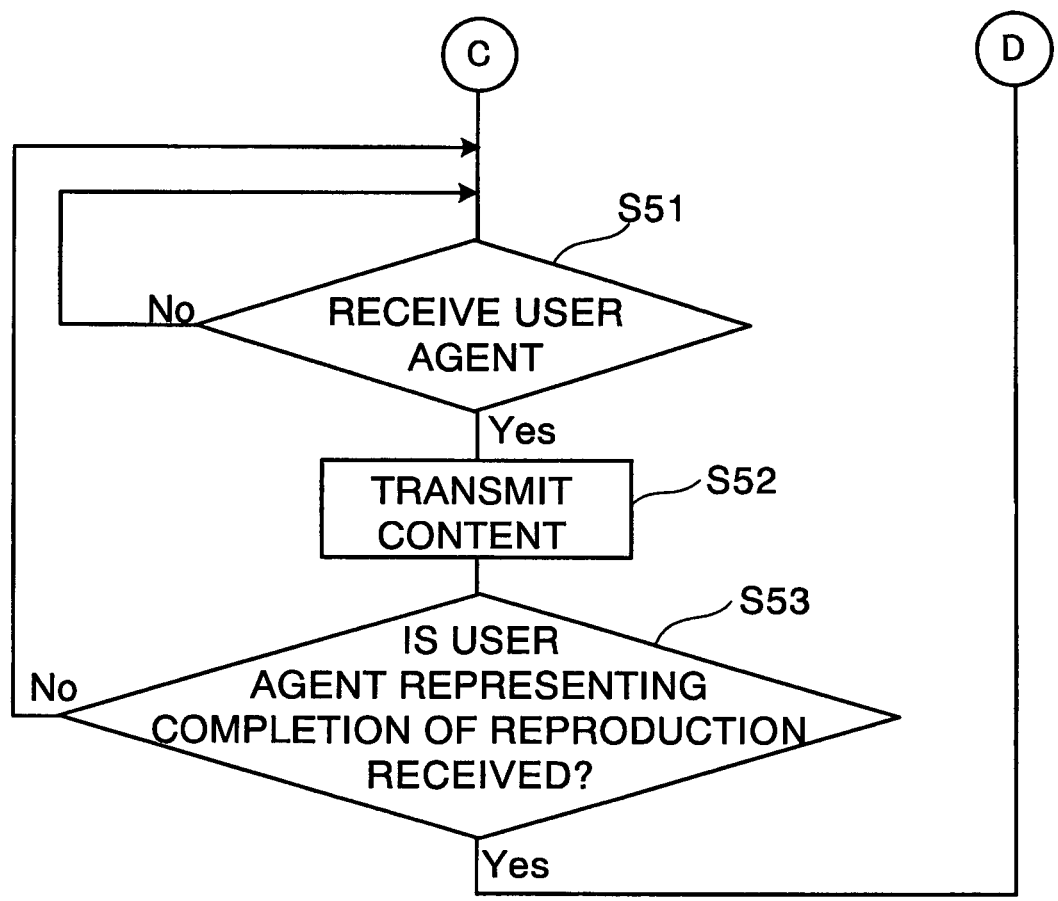

FIG. 10 is a flow chart that illustrates processing in the user device illustrated in FIG. 4, and FIG. 11 is a flow chart that illustrates processing in the data broadcasting server illustrated in FIG. 5.

The user devices 2, 3 and 4 and the server 6 proceed with the respective processes while communicating with each other and thus, the processes of the user devices 2, 3 and 4 and the server 6 illustrated in FIG. 4 and FIG. 5 will be described with reference to FIG. 10 and FIG. 11 alternately. The processing of the user device will be described by taking the user device 2 among the three user devices illustrated in FIG. 1 as an example, and a case of the other user device 3 will also be described as necessary.

At first, acquisition of information on the user device 2 is executed in the user device 2 (step S10). In the acquisition of the information, the transmission requesting section 203 reads the manufacturer ID, the model ID and the serial number that are pieces of information on the user device 2 from the ID storage section 205.

Next, it is determined whether the current processing in the user device 2 is resumption processing after a reproduction interruption (step S11). The reproduction interruption and the resumption processing will be described later. In this step, it is determined whether the reproduction is interrupted by an abnormality such as hang-up of the processing during the reproduction of the previous content. If there is no abnormality (step S11: No), processing in the next step S12 is executed.

Next, TV broadcast wave reception processing is executed (step S12). In the TV broadcast wave reception processing, the broadcast receiving section 201 receives a broadcast wave from the broadcasting station 1 (see FIG. 1). Also, the display section 202 displays the content C1 of the broadcast wave received by the broadcast receiving section 201. Image data and the menu data M1 are included in the content C1, and the display section 202 decodes and displays the information on the image.

When the user operation section 204 receives operation of starting the data broadcasting by the user (step S13: Yes), the broadcast content display section 202 displays the menu data M1 included in the content C1. Thus, as illustrated in FIG. 7, an ordinary TV program is displayed in the area P1 of the display screen 23a, and the buttons of the data broadcasting are displayed in the area P3.

Next, in response to the user operation section 204 receiving the link selection operation of selecting any of the displayed buttons (step S15: Yes), the transmission requesting section 203 starts communicating with the server 6 (step S16). The server 6 also starts communicating with the user device 2 (step S41).

Here, when the user device 2 is disabled to communicate with the server 6 because of, for example, not being connected to the network 7 (step S17: No), the user device 2 may not receive the data broadcasting service and receive only the broadcast wave. On the other hand, when the communication with the server 6 is possible (step S17: Yes), the transmission requesting section 203 transmits a submenu request (step S18). To be more specific, the transmission requesting section 203 transmits a transmission command (transmission request) to transmit the data indicated by the primary link information of the button selected by the link selection operation to the server 6, and the user agent is inserted into this transmission command. As illustrated in FIG. 8, the user agent includes the information of the manufacturer ID, the model ID and the receiver ID. The transmission requesting section 203 inserts the manufacturer ID, the model ID and the serial number read from the ID storage section 205 in the above-described step S10 into the user agent, and sends the transmission command.

Upon receipt of the transmission command of the submenu request and the user agent included in the transmission command from the user device 2 (step S42), the reproduction qualification determination section 602 of the server 6 transmits the submenu data stored in the content storage section 606 to the user device 2 (step S43).

In the user device 2, upon receipt of the submenu data from the server 6 by the secondary link receiving section 212, the submenu is displayed (step S19).

FIG. 12 is a diagram that illustrates a state in which the submenu is displayed in the user device.

In the upper left area P1 on the display screen 23a of the image display unit 23 in the user device 2, an image of the broadcast content received from the broadcasting station is displayed like the case of FIG. 7. In the upper right area P3 of the display screen 23a, the submenu data is displayed. The submenu data has plural pieces of secondary link information. Corresponding to the respective pieces of the secondary link information, four buttons of "cat man [pay]", "10/10 lunchtime news [free]", "fair spring day [pay]", and "10/10 nighttime news [free]" are displayed in a selectable manner.

When the user operation section 204 of the user device 2 receives operation of selecting a free-of-charge content displayed as "[free]" by the user (step S20: Yes), the content requesting section 213 requests the transmission of the free content based on the URL of the selected secondary link information (step S21). When operation of selecting a pay content displayed as "[pay]" by the user (step S22: Yes), the content requesting section 213 requests the transmission of the pay content based on the URL of the selected secondary link information (step S23).

In the server 6, upon receipt of the request to transmit the pay content but the free content (No in step S44, and Yes in step S45), it is determined whether the manufacturer ID included in the user agent received in the above-mentioned step S42 is being authorized (step S46). Here, "authorized" means that the user device is produced by a manufacturer registered in the correspondence information 601a and the content reproduction qualification may be recognized, and is to distinguish the user device from user devices that are not sold as a user device in which pay contents may be viewed, such as a self-made PC. Whether being authorized or not is determined based on whether the manufacturer ID included in the user agent is present in the correspondence information 601a stored in the qualification storage section 601.

When determining that the manufacturer ID is being authorized (step S46: Yes), the reproduction qualification determination section 602 acquires the reproduction qualification information from the model ID (step S47), and determines whether the user device is qualified to reproduce the content (step S48). To be more specific, the reproduction qualification determination section 602 refers to the correspondence information 601a stored in the qualification storage section 601, and thereby obtains the reproduction qualification information corresponding to a combination of the manufacturer ID and the model ID included in the user agent. For example, when the user device 2 that has transmitted the user agent is a model "b" of the company A, the reproduction qualification determination section 602 determines that this user device 2 is qualified to reproduce the content based on the manufacturer ID and the model ID. Meanwhile, for example, when another user device 3 that is the model "a" of the company A has sent the user agent, it is determined that this user device 3 is not qualified to reproduce the content.

When the reproduction qualification determination section 602 determines that the manufacturer ID is not being authorized in the above-described step S46, or determines that the user device is not qualified to reproduce the content in the above-described step S48, the content transmission section 604 transmits a qualification warning message saying that there is no qualification to reproduce the content to the user device (step S49), and waits for the next content request (step S44). On the other hand, when the reproduction qualification determination section 602 determines that the manufacturer ID is being authorized and the user device is qualified to reproduce the content, the content transmission section 604 transmits the device key corresponding to the requested content to the user device (step S50), and upon receipt of the user agent from the user device (step S51: Yes), the content transmission section 604 transmits the requested content (step S52). The device key is inserted into the user agent (see FIG. 8) and transmitted. Incidentally, when a request to transmit the free content is received in the above-described step S44 (step S44: Yes), the content transmission section 604 transmits the requested content immediately (step S52).

When the communication content reproduction section 206 receives the warning message (step S24: Yes), the user device displays the qualification warning message (step S25) and waits for the content selection operation (step S20).

Figure 13:
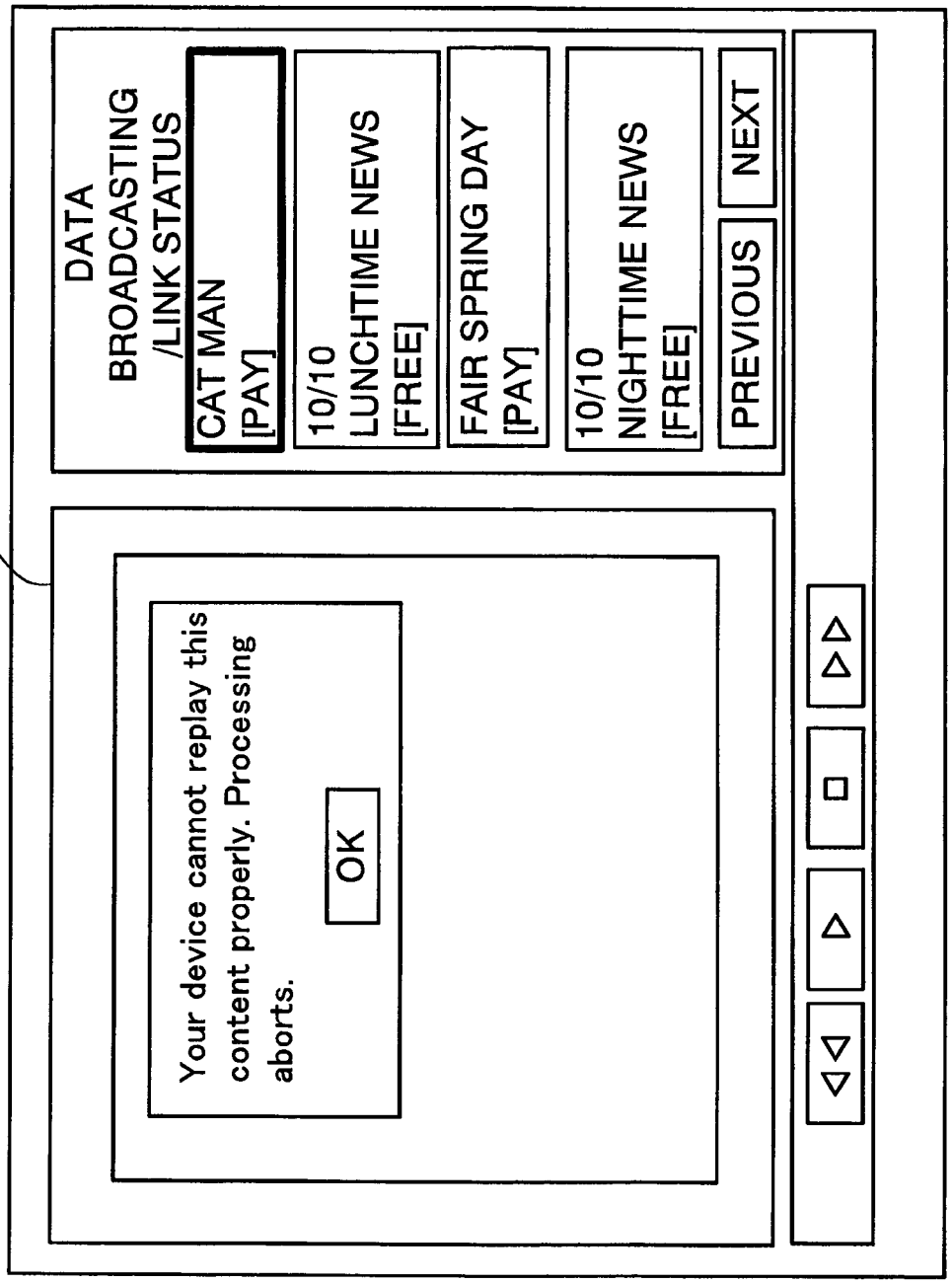
FIG. 13 is a diagram that illustrates a state in which the qualification warning message is displayed on the display screen of the user device.

FIG. 13 is a diagram that illustrates a state in which the qualification warning message is displayed on the display screen of the user device.

When the warning message is not received (step S24: No), the communication content reproduction section 206 receives the device key (step S26). Subsequently, the communication content reproduction section 206 inserts a value presenting the reproduction into the reproduction status code of the user agent (see FIG. 8) (step S27), and receives and displays the content that has been transmitted from the server 6 (step S28). The communication content reproduction section 206 reproduces the encoded pay content by decoding the content using the device key, and the communication content reproduction section 206 reproduces the free content without decoding the content because the free content is not encoded.

FIG. 14 is a diagram that illustrates a state in which the pay content that has been transmitted from the server is displayed on the display screen of the user device.

Until the reception of the content is completed without the reproduction being interrupted by an abnormality such as hang-up (step S29: No), the user device 2 continues the reception and reproduction processing in the above-described step S28.

In the user device 2, when the reception of the content is completed (step S30: Yes), the communication content reproduction section 206 inserts a value presenting the completion of the reproduction into the reproduction status code of the user agent (see FIG. 8) and transmits the user agent to the server 6 (step S31). Further, the communication content reproduction section 206 displays an image presenting the end on the display screen (step S32), and performs the display processing of the submenu illustrated in FIG. 12 (step S19).

Upon receipt of the user agent into which the value presenting the completion of the reproduction is inserted (step S53: Yes), the server 6 assumes that all the reproduction of the content in the user device is completed and returns to the state of waiting for the next content request (step S44). Until the user agent presenting the completion of the reproduction arrives, the server 6 maintains the state of processing the transmission of the content (step S52). To be more specific, even after transmitting the last piece of the content, the content transmission section 604 waits in a state in which the transmission may be performed. Thus, in a case in which the reproduction of the content is interrupted by an abnormality such as hang-up during the reproduction of the content in the user device 2 (step S29: Yes), and the processing in the user device 2 is stopped, and then the processing is restarted, namely, resumed from step S10, the user device 2 determines that the processing is resumed after the interruption in the above-described step S11, and may immediately resume the reproduction of the content without performing communication or determination for the reproduction qualification even when the processing of transmitting the user agent (step S27) is started.

According to the above-described data broadcasting system S, a special content may be reproduced only by the user device of a specific type in a simple structure, without introducing a special device e.g. IC card or changing the content for each user device. Therefore, the pay-content viewing system may be caused to support the broadcasting system represented by the one-segment broadcasting.

This means that the following additional feature to the above-described basic feature is preferable. The user device further includes: a broadcast receiving section that receives a broadcast from a broadcasting station; and a broadcast content display section that displays a content which is received from the broadcasting station and which includes primary link information indicating secondary link information indicating other content on the network. In addition, the transmission requesting section includes: a secondary link information requesting section that requests, in response to the primary link information in the content displayed by the broadcast content display section being designated by a user's operation, to transmit the secondary link information indicated by the designated primary link information, accompanied by the user device's own model information, via the network; a secondary link information receiving section that receives the secondary link information requested to transmit by the secondary link information requesting section, via the network; and a content requesting section that requests, in response to the secondary link information received by the secondary link information receiving section being designated by the user's operation, to transmit the content indicated by the designated secondary link information, via the network.

Incidentally, in the above description of each specific embodiment, the one server 6 is taken as an example of the data broadcasting server in the basic feature described in "SUMMARY", but this data broadcasting server is not limited to one and may be more than one. Further, in the data broadcasting server, the content transmission section and the content storage section may be separated from other functions and provided in two or more servers.

Furthermore, in the above description of each specific embodiment, the case of the personal computer is taken as an example of the user device in the basic feature that described in "SUMMARY", but this user device may be a portable telephone, information user device equipment, and a television receiver, other than the personal computer.

Moreover, in the above description of each specific embodiment, the Internet is taken as an example of the network in the basic feature described in "SUMMARY", but this network may be a LAN (Local Area Network) or may be a WAN (Wide Area Network).

Further, in the above description of each specific embodiment, the correspondence information in tabular form is taken as an example of the correspondence information in the basic feature described in "SUMMARY", but this correspondence information may be in other form.

In addition, in the above description of each specific embodiment, the data broadcasting program stored in the CD-ROM 260 is presented as the data broadcasting program in the basic feature described in "SUMMARY". However, the medium that stores this data broadcasting program may be of any type as long as the medium stores a program, and may be, for example, a magnetic disk of a hard disk drive, or may be a flexible disc, an MO disk or DVD, or may be a card type or tape type storage medium. Moreover, this data broadcasting program is not limited to the program stored in a storage medium, and may be, for example, communicated in a communication line.

According to the above-described basic feature, the data broadcasting server receives the model information from the user device that sends the request to transmit the content, and the data broadcasting server transmits the key information of the content according to the reproduction qualification information of the user device obtained by referring to the correspondence information. Therefore, a special content may be reproduced only by the user device of a specific type in a simple structure, without introducing a special device e.g. IC card or changing the content for each user device.

All examples and conditional language recited herein are intended for pedagogical purposes to aid the reader in understanding the invention and the concepts contributed by the inventor to furthering the art, and are to be construed as being without limitation to such specifically recited examples and conditions nor does the configuration of such examples in the specification relate to a showing of the superiority and inferiority of the invention. Although the embodiments of the present invention have been described to be more specific, it should be understood that the various changes, substitutions, and alterations could be made hereto without departing from the spirit and scope of the invention.

What is claimed is:

1. A data broadcasting system comprising:
   a user device that includes:
      a transmission requesting section that is connected to a network, and transmits, via the network, the user device's own model information and a request to transmit a content on the network, and
      a content reproduction section that receives an encrypted content which is the content requested by the transmission requesting section and key information which is used to decrypt the content, and decrypts the content to reproduce the key information,
      a broadcast receiving section that receives a broadcast from a broadcasting station, and
      a broadcast content display section that displays a content which is received from the broadcasting station and which includes primary link information indicating secondary link information indicating other content on the network,
   the transmission requesting section includes:
      a secondary link information requesting section that requests, in response to the primary link information in the content displayed by the broadcast content display section being designated by a user's operation, to transmit the secondary link information indicated by the designated primary link information, accompanied by the user device's own model information, via the network,
      a secondary link information receiving section that receives the secondary link information requested to transmit by the secondary link information requesting section, via the network, and
      a content requesting section that requests, in response to the secondary link information received by the secondary link information receiving section being designated by the user's operation, to transmit the content indicated by the designated secondary link information, via the network; and
   a data broadcasting server that includes:
      a qualification storage section that stores correspondence information in which model information and reproduction qualification information representing a content reproduction qualification a model included in the model information are associated with each other,
      a reproduction qualification determination section that refers to the correspondence information upon receipt of the request to transmit the model information and the content sent from the user device, obtains the reproduction qualification information according to the model information of the user device, and determines using a manufacturer ID and a model ID, whether the user device is qualified to reproduce the content requested to transmit from the user device, and
      a content transmission section that transmits, to the user device, the content determined by the reproduction qualification determination section that the user device is qualified to reproduce, and the key information used to reproduce the content.

2. A data broadcasting server that transmits a content to a user device that includes
   a transmission requesting section that is connected to a network, and transmits, via the network, the user device's own model information and a request to transmit a content on the network,
   a content reproduction section that receives an encrypted content which is the content requested by the transmission requesting section and key information which is used to decrypt the content, and decrypts the content to reproduce the key information,
   a broadcast receiving section that receives a broadcast from a broadcasting station,
   a broadcast content display section that displays a content which is received from the broadcasting station and which includes primary link information indicating secondary link information indicating other content on the network, and
   the transmission requesting section includes:
      a secondary link information requesting section that requests, in response to the primary link information in the content displayed by the broadcast content display section being designated by a user's operation, to transmit the secondary link information indicated by the designated primary link information, accompanied by the user device's own model information, via the network;

a secondary link information receiving section that receives the secondary link information requested to transmit by the secondary link information requesting section, via the network; and a content requesting section that requests, in response to the secondary link information received by the secondary link information receiving section being designated by the user's operation, to transmit the content indicated by the designated secondary link information, via the network, the data broadcasting server comprising:

a qualification storage section that stores correspondence information in which model information and reproduction qualification information representing a content reproduction qualification a model included in the model information are associated with each other;

a reproduction qualification determination section that refers to the correspondence information upon receipt of the request to transmit the model information and the content sent from the user device, obtains the reproduction qualification information according to the model information of the user device, and determines, using a manufacturer ID and a model ID, whether the user device is qualified to reproduce the content requested to transmit from the user device; and a content transmission section that transmits, to the user device, the content determined by the reproduction qualification determination section that the user device is qualified to reproduce, and the key information used to reproduce the content.

3. A non-transitory storage medium that stores a data broadcasting program that is incorporated into a computer, and causes the computer to function as a data broadcasting server that transmits a content to a user device, the user device including a transmission requesting section that is connected to a network, and transmits, via the network, the user device's own model information and a request to transmit a content on the network, a content reproduction section that receives an encrypted content which is the content requested by the transmission requesting section and key information which is used to decrypt the content, and decrypts the content to reproduce the key information, a broadcast receiving section that receives a broadcast from a broadcasting station, a broadcast content display section that displays a content which is received from the broadcasting station and which includes primary link information indicating secondary link information indicating other content on the network, and the transmission requesting section includes:

a secondary link information requesting section that requests, in response to the primary link information in the content displayed by the broadcast content display section being designated by a user's operation, to transmit the secondary link information indicated by the designated primary link information, accompanied by the user device's own model information, via the network, a secondary link information receiving section that receives the secondary link information requested to transmit by the secondary link information requesting section, via the network, and a content requesting section that requests, in response to the secondary link information received by the secondary link information receiving section being designated by the user's operation, to transmit the content indicated by the designated secondary link information, via the network, and the data broadcasting program comprising:

storing correspondence information in which model information and reproduction qualification information representing a content reproduction qualification in the model information are associated with each other;

obtaining, with reference to the correspondence information upon receipt of the request to transmit the model information and the content sent from the user device, the reproduction qualification information according to the model information of the user device, and determining, using a manufacturer ID and a model ID, whether the user device is qualified to reproduce the content requested to transmit from the user device; and transmitting, to the user device, the content when the user device is qualified to reproduce the content, and the key information used to reproduce the content.

4. A data broadcasting system comprising:

a user device including a processor, the processor executing:

transmitting, via a connection with a network, the user device's own model information and a request to transmit a content on the network, and receiving an encrypted content which is the content requested by the transmitting and key information which is used to decrypt the content, and decrypts the content to reproduce the key information, receiving a broadcast from a broadcasting station, displaying a content which is received from the broadcasting station and which includes primary link information indicating secondary link information indicating other content on the network, requesting, in response to the primary link information in the content displayed by the broadcast content display section being designated by a user's operation, to transmit the secondary link information indicated by the designated primary link information, accompanied by the user device's own model information, via the network, receiving the secondary link information via the network, and requesting, in response to the secondary link information received, to transmit the content indicated by the designated secondary link information, via the network; and a data broadcasting server including a memory and a processor, the processor executing:

storing, in the memory, correspondence information in which model information and reproduction qualification information representing a content reproduction qualification of a model included in the model information are associated with each other, referring to the correspondence information upon receipt of the request to transmit the model information and the content sent from the user device, obtaining the reproduction qualification information according to the model information of the user device, determining whether the user device is qualified to reproduce the content requested to transmit from the user device, and transmitting, to the user device, the determined content that the user device is qualified to reproduce, and the key information used to reproduce the content.

5. A data broadcasting server that transmits a content to a user device connected with a network, the user device including a memory and processor, and transmits, via the network, the user device's own model information and a request to transmit a content on the network, and receives an encrypted content which is the content requested by the processor and key information which is used to decrypt the content, and decrypts the content to reproduce the key information, the data broadcasting server comprising:

a memory; and a processor, the processor executing:

storing, in the memory, correspondence information in which model information and reproduction qualification information representing a content reproduction qualification a model included in the model information are associated with each other, referring to the correspondence information upon receipt of the request to transmit the model information and the content sent from the user device, obtaining the reproduction qualification information according to the model information of the user device, determining whether the user device is qualified to reproduce the content requested to transmit from the user device, and transmitting, to the user device, the determined content that the user device is qualified to reproduce, and the key information used to reproduce the determined content, and wherein the processor of the user device executes:

receiving a broadcast from a broadcasting station, displaying a content which is received from the broadcasting station and which includes primary link information indicating secondary link information indicating other content on the network, requesting, in response to the primary link information in the content displayed, to transmit the secondary link information indicated by the designated primary link information, accompanied by the user device's own model information, via the network, receiving the secondary link information requested, via the network, and requesting, in response to the secondary link information received, to transmit the content indicated by the designated secondary link information, via the network.

6. A non-transitory storage medium that stores a data broadcasting program that is incorporated into a computer, and causes the computer to function as a data broadcasting server that transmits a content to a user device connected with a network, the user device including a memory and a processor, and transmits, via the network, the user device's own model information and a request to transmit a content on the network, and receives an encrypted content and key information which is used to decrypt the content, and decrypts the content to reproduce the key information, the program comprising:

storing correspondence information in which model information and reproduction qualification information representing a content reproduction qualification in the model information are associated with each other;

referring to the correspondence information upon receipt of the request to transmit the model information and the content sent from the user device;

obtaining the reproduction qualification information according to the model information of the user device;

determining whether the user device is qualified to reproduce the content requested to transmit from the user device; and transmitting to the user device, the determined content that the user device is qualified to reproduce, and the key information used to reproduce the determined content, and wherein the processor of the user device executes:

receiving a broadcast from a broadcasting station, displaying a content which is received from the broadcasting station and which includes primary link information indicating secondary link information indicating other content on the network, requesting, in response to the primary link information in the content displayed, to transmit the secondary link information indicated by the designated primary link information, accompanied by the user device's own model information, via the network, receiving the secondary link information requested, via the network, and requesting, in response to the secondary link information received, to transmit the content indicated by the designated secondary link information, via the network.

* * * * *